(12) United States Patent
Huang (10) Patent No.: US 8,181,383 B2
(45) Date of Patent: May 22, 2012

(54) MOUSE TRAP HAVING RETRACTABLE BITING PORTIONS

(76) Inventor: Chang-Hsiu Huang, Pusin Township, Changhua County (TW)

( * ) Notice: Subject to any disclaimer, the term of this patent is extended or adjusted under 35 U.S.C. 154(b) by 366 days.

(21) Appl. No.: 12/591,802

(22) Filed: Dec. 2, 2009

(65) Prior Publication Data

US 2011/0126446 A1 Jun. 2, 2011

(51) Int. Cl.
*A01M 23/00* (2006.01)
*A01M 23/24* (2006.01)

(52) U.S. Cl. .................... 43/81; 43/82; 43/83.5

(58) Field of Classification Search ....... 43/77, 81–83.5, 43/58, 59, 90, 91.95, 96; 24/507, 521, 561, 24/564

See application file for complete search history.

(56) References Cited

U.S. PATENT DOCUMENTS

| 243,953 A | * | 7/1881 | Norris | 43/81 |
| 7,757,429 B1 | * | 7/2010 | Cambio | 43/81 |

* cited by examiner

*Primary Examiner* — David Parsley
*Assistant Examiner* — Danielle Clerkley
(74) *Attorney, Agent, or Firm* — Rosenberg, Klein & Lee (57) ABSTRACT

This invention relates to a mouse trap having retractable biting portions. It includes a base, a movable portion, and a trigger. The base has a front seat which has a lower outer edge and several receiving holes. The movable portion is disposed on the base and has a front frame portion and a restoring force generating element. The front frame portion is disposed with an upper outer edge and a plurality of retractable biting portions. These retractable biting portions are corresponding to the receiving holes. The restoring force generating element is able to urge the movable portion moving from the first position to the second position. So, it can capture a mouse quickly. The protruded length of each retractable biting portion is automatically adjusted. Hence, the captured mouse will not bleed so it is sanitary. The capture method is humane without sacrificing its capturing result. The safety of the product can be enhanced. Plus, the biting depth is automatically adjusted.

5 Claims, 10 Drawing Sheets

MOUSE TRAP HAVING RETRACTABLE BITING PORTIONS

BACKGROUND OF THE INVENTION

1. Field of the Invention

The present invention relates to a mouse trap. Particularly, it relates to a mouse trap having retractable biting portions. The captured mouse will not bleed so it is sanitary. The capture method is humane without sacrificing its capturing result. The safety of the product can be enhanced. Plus, the biting depth is automatically adjusted.

2. Description of the Prior Art

Figure 8:
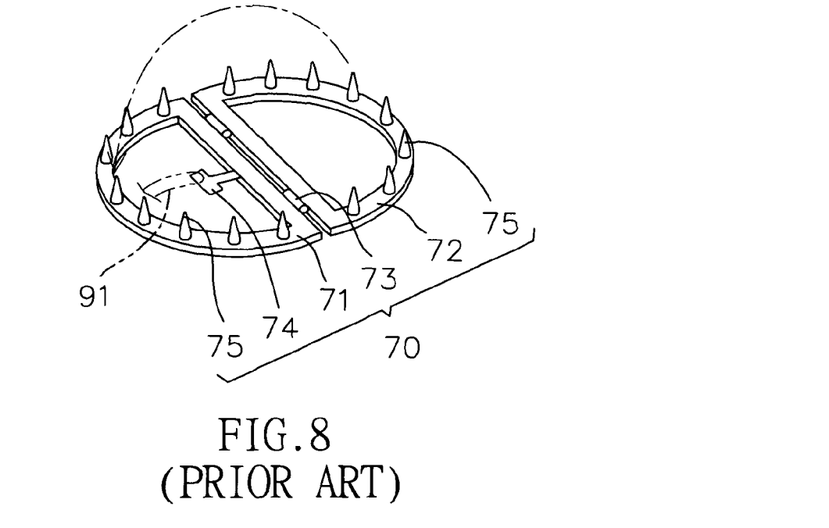
FIG. 8 is a perspective view showing the first traditional mouse trap.

Referring to FIG. 8, it shows a first traditional mouse trap 70. It includes a fixed frame 71, a biting frame 72, a resilient force generator 73, and a baiting portion 74. There are many sharp thorns 75 disposed on the fixed frame 71 and on the biting frame 72 for firmly capturing the body of the mouse 91.

Figure 9:
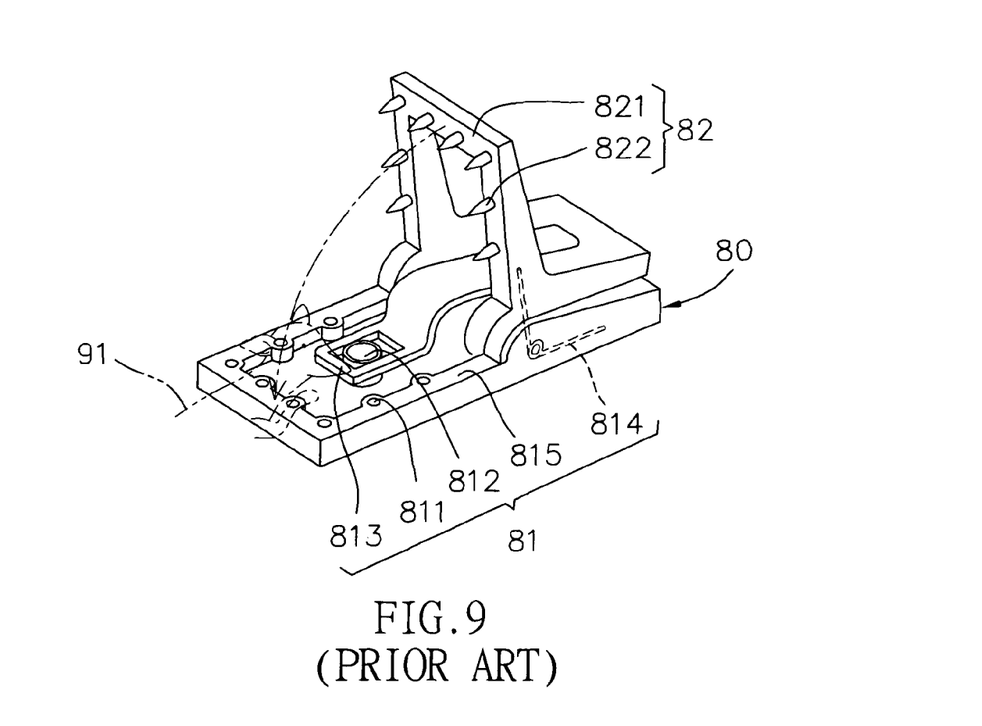
FIG. 9 is a perspective view showing the second traditional mouse trap.

As illustrated in FIG. 9, it shows the second traditional mouse trap 80. It includes a base 81 and a movable frame 82. The base 81 contains a plurality of receiving holes 811, a bait holder 812, a triggering plate 813, a resilient force generator 814, and a lower outer frame 815. The movable frame 82 contains an upper outer frame 821 and a plurality of fixed sharp rods 822. These fixed sharp rods 822 match with the receiving holes 811. When a mouse 91 approaches the bait holder 812 and presses down the triggering plate 813, the resilient force generator 814 pushes the movable frame 82 so that the upper outer frame 821 moves down (toward the lower outer frame 815) to capture the mouse 91. Also, these sharp rods 822 pierce the skin of the mouse 91. Eventually, this mouse 91 is captured.

However, the above two traditional mouse traps still have the following problems.

[1] The captured mouse will bleed so it is unsanitary. The traditional mouse trap is designed with fixed sharp thorns 75 or sharp rods 822. The design concept is as sharp as possible. In addition, the biting movement must be quick and heavy. However, once a mouse 91 is captured, these sharp thorns 75 or sharp rods 822 will pierce the skin of the mouse 91. Therefore, the mouse will bleed a lot. Not only it is very nasty, but also it is unsanitary (causing some insect or bacteria propagation).

[2] The piercing capture method is not humane. For most highly developed countries in America or Europe, killing an animal must be humane. For example, when a pig is killed, it will use the electric killing method. Similarly, if the captured mouse is bloody and messy (and even screaming), the society of the prevention of cruelty to animals (or similar organization/people) will express a greatest protest. Although the traditional mouse traps can capture a mouse, they are too cruel. Therefore, this kind of products is not humane.

[3] Kids or pets might get hurt due to accidently pressing the trigger. The sharp thorns and sharp rods are useful in capturing the mouse, but they are possible to hurt the kids and pets. If the kid or pet is curious to touch the traditional mouse trap, it is highly possible to be injured by these sharp thorns and sharp rods accidently. For young kids, it is more dangerous. So, the traditional products are not safe. It is easy to receive a consumer's complaint (or even a law suit).

SUMMARY OF THE INVENTION

The object of the present invention is to provide a mouse trap having retractable biting portions. The captured mouse will not bleed so it is sanitary. The capture method is humane without sacrificing its capturing result. The safety of the product can be enhanced. Plus, the biting depth is automatically adjusted. Therefore, it can solve the problems listed as follows. The captured mouse will bleed so it is unsanitary. The piercing capture method is not humane. Kids or pets might get hurt due to accidently pressing the trigger.

In order to achieve the above object, this invention is provided. A mouse trap having retractable biting portions comprises:

a base having a front seat, a pivoting portion, and a rear seat, the front seat having a substantially U-shaped lower outer edge, a plurality of receiving holes, and a bait holder, a hooking portion being disposed on the rear seat;

a movable portion having a front frame portion, an upper frame portion, and a restoring force generating element, the front frame portion being disposed with an upper outer edge and a plurality of retractable biting portions, the upper outer edge being corresponding to the lower outer edge, the movable portion being pivoted on the pivoting portion of the base and having at least a first position and a second position, the restoring force generating element generating a force to urge the movable portion moving from the first position to the second position;

a trigger pivotally mounted on the base, the trigger having a triggering plate and a triggering opening, the triggering plate having a front triggering edge, so that when the trigger is pressed, the triggering opening slides over an opposite end of the hooking portion, so as to force the movable portion from the first position quickly moving to the second position, and the retractable biting elements insert into the corresponding receiving holes;

each of the retractable biting portions including:

[a] a recess disposed on the front frame portion;

[b] a biting element being retractable within a predetermined distance in the recess, the biting element having an outer end and an inner end;

[c] a resilient portion connected with the inner end of the biting element and the recess so that the biting element is retractable in the recess.

DETAILED DESCRIPTION OF THE PREFERRED EMBODIMENT

Referring to FIGS. 1, 2, 3, 4A and 4B, the present invention is a mouse trap having retractable biting portions. It mainly comprises a base 10, a movable portion 20, and a trigger 30.

About this base 10, it has a front seat 11, a pivoting portion 12, and a rear seat 13. The front seat 11 has a substantially U-shaped lower outer edge 111, a plurality of receiving holes 112, and a bait holder 113. A hooking portion 131 is disposed on the rear seat 13.

Concerning the movable portion 20, it has a front frame portion 21, an upper frame portion 22, and a restoring force generating element 23. The front frame portion 21 is disposed with an upper outer edge 211 and a plurality of retractable biting portions 212. The upper outer edge 211 is corresponding to the lower outer edge 111. This movable portion 20 is pivoted on the pivoting portion 12 of the base 10 and has at least a first position P1 and a second position P2 (shown in FIG. 5A). The restoring force generating element 23 is able to generate a force to urge the movable portion 20 moving from the first position P1 to the second position P2.

Figure 3:
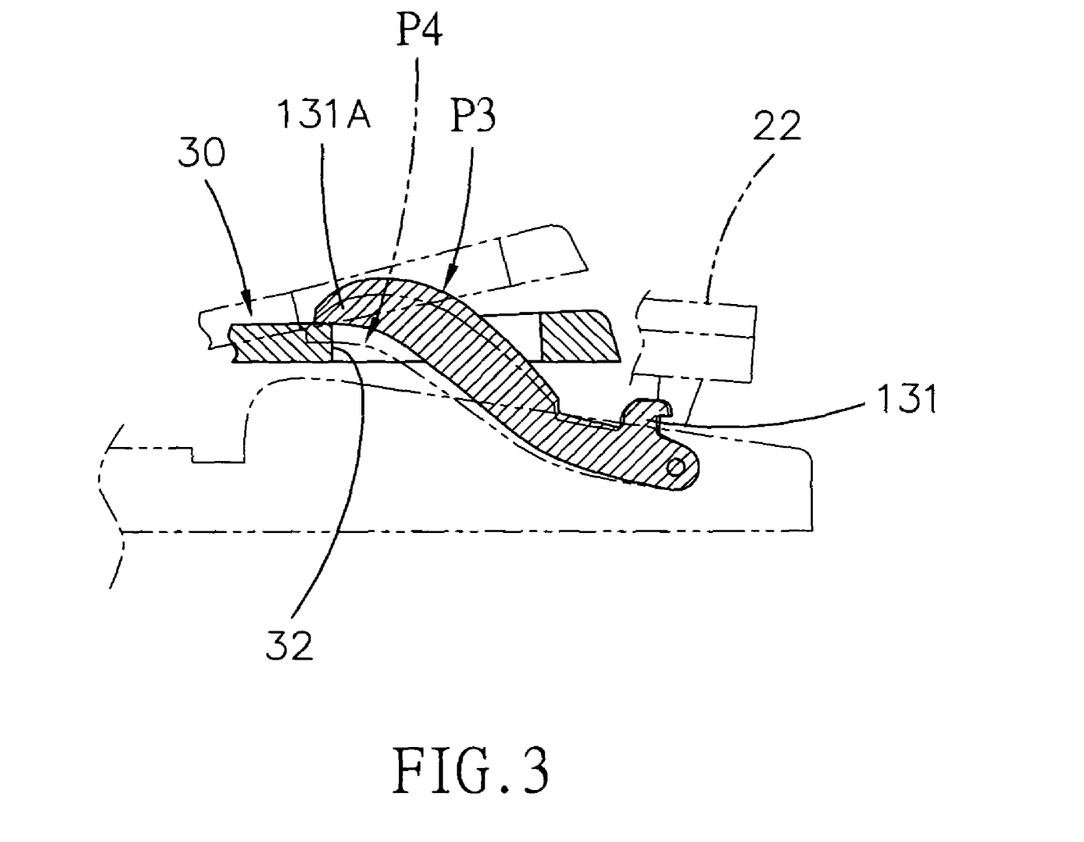
FIG. 3 is a view showing the trigger's movement in this invention.

The trigger 30 is pivotally mounted on the base 10. This trigger 30 has a triggering plate 31 and a triggering opening 32. The triggering plate 31 has a front triggering edge 311. So, when the trigger 30 is pressed by a mouse or the like, the triggering opening 32 slides over an opposite end 131A of the hooking portion 131 (as shown in FIG. 3, from a hooking position P3 to a releasing position P4), so as to force the movable portion 20 from its first position P1 quickly moving to the second position P2. At the same time, and these retractable biting portions 212 insert into the corresponding receiving holes 112.

Figure 5A:
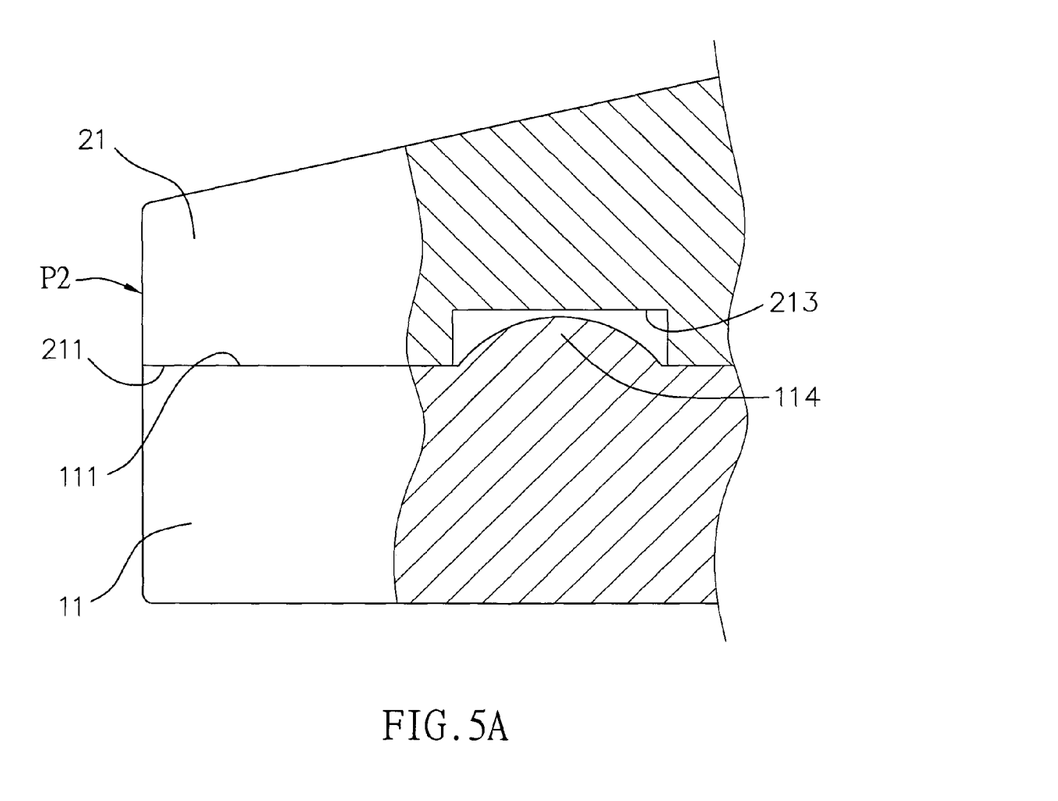
FIG. 5A is a cross-sectional view taken along VA-VA in FIG. 4B.
Figure 5B:
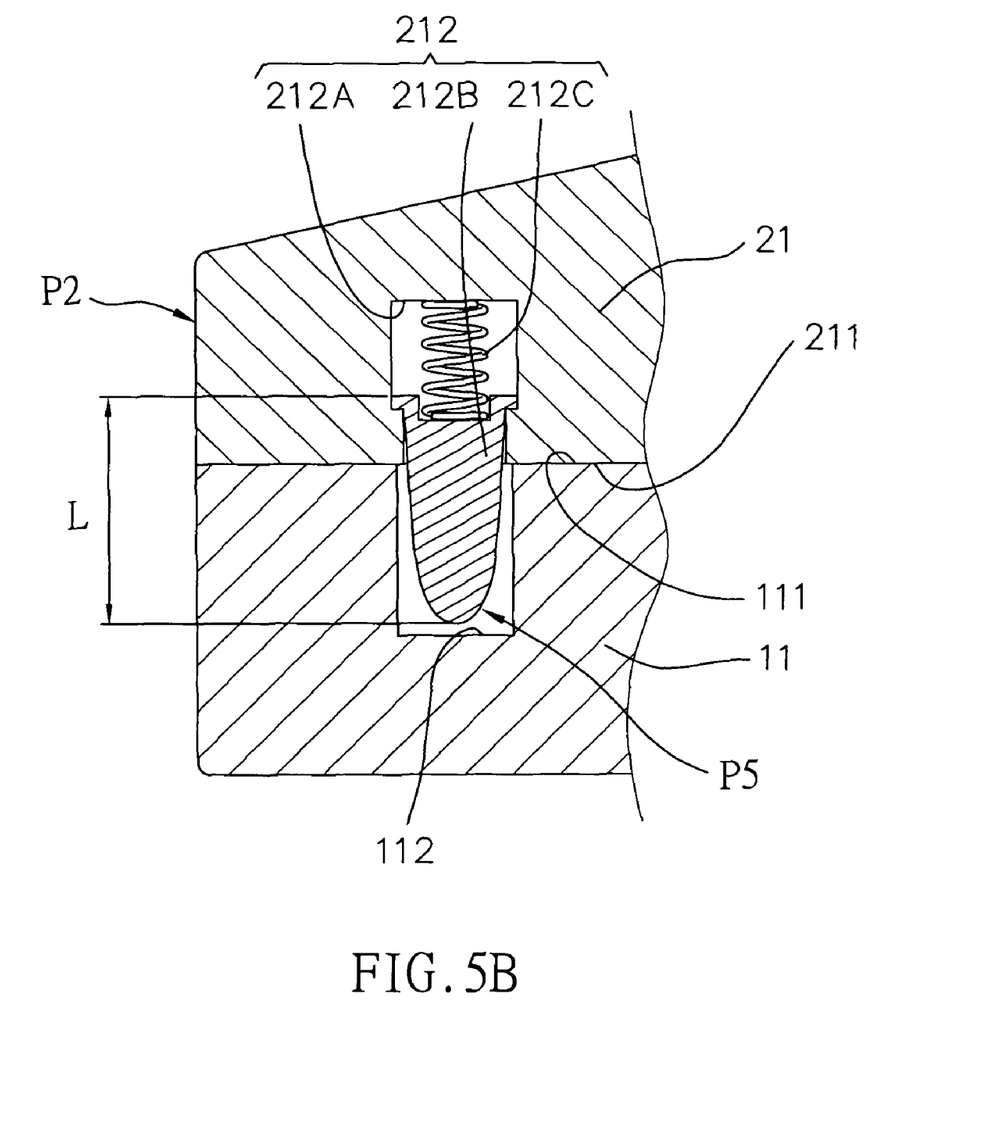
FIG. 5B is a cross-sectional view taken along VB-VB in FIG. 4B.

Particularly, as illustrated in FIG. 5B, each of the retractable biting portions 212 includes:

[a] a recess 212A disposed on the front frame portion 21;

[b] a biting element 212 B being retractable within a predetermined distance in the recess 212A, the biting element 212 B having an outer end and an inner end;

[c] a resilient portion 212C connected with the inner end of the biting element 212B and the recess 212A so that the biting element 212B is retractable in the recess 212A.

Figure 6:
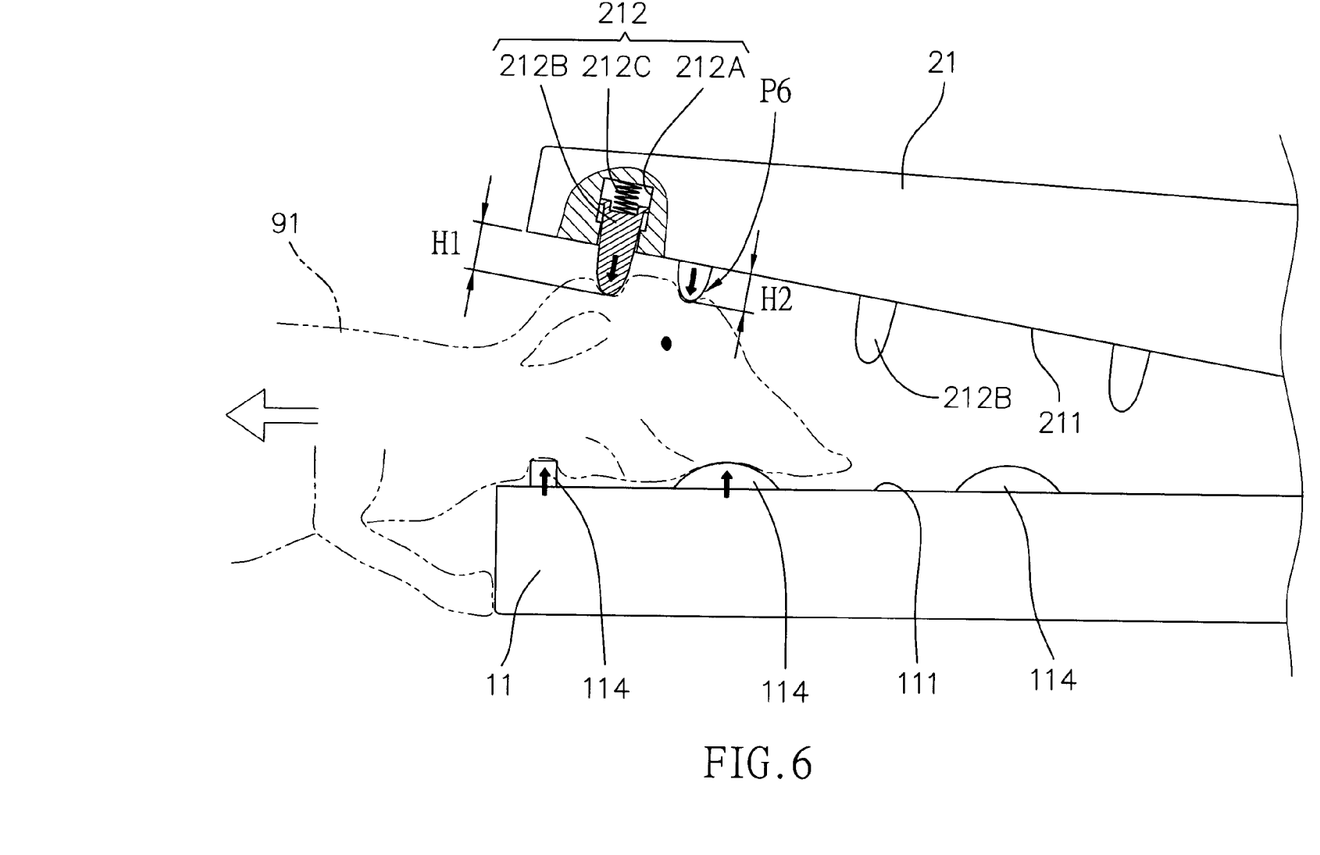
FIG. 6 is a view illustrating a mouse that is captured by the retractable biting portions and the protruded blocks.

Practically, as shown in FIGS. 5B and 6, the retractable biting element 212B has a tooth length L and can move between an extending position P5 and a retracted position P6. When the retractable biting element 212B moves to the extended position P5, at least 50% of the tooth length L is protruded out (if less than 50%, its capturing result is poor). When the retractable biting element 212B moves to the retractable position P6, 20% to 50% of the tooth length L is protruded out (if less than 20% or over 50%, the capturing result is bad).

In addition, the outer end of the biting element 212B is blunt, in order to avoid it pierce the mouse's skin.

Also, the restoring force generating element 23 is a coiled spring or a leaf spring.

Figure 1:
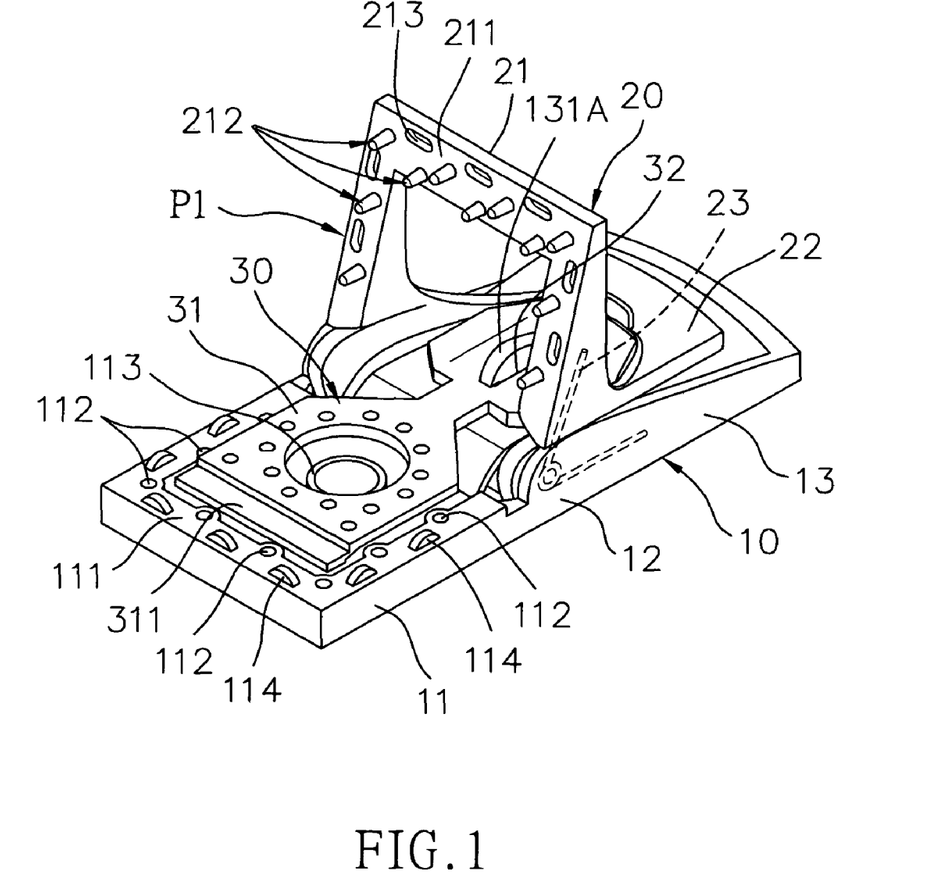
FIG. 1 is a perspective view of the present invention.
Figure 2:
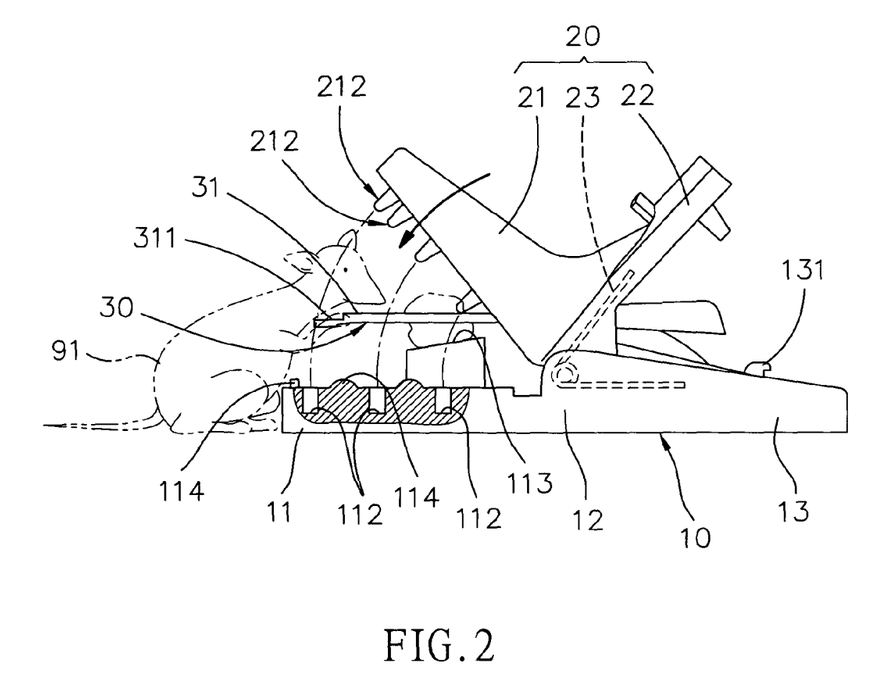
FIG. 2 is a view showing an application of the present invention.

Referring to FIG. 2, when a mouse 91 steps on the triggering plate 31 of the trigger 30, the triggering opening 32 slides over an opposite end 131A of the hooking portion 131 (as shown in FIG. 3, from a hooking position P3 to a releasing position P4). Therefore, it forces the movable portion 20 from its first position P1 quickly moving to the second position P2. At the same time, the upper outer edge 211 moves to the lower outer edge 111 (as shown in FIG. 5A) sharply for clipping the mouse 91. Accordingly, these retractable biting portions 212 insert into the corresponding receiving holes 112 extremely quickly. So, the mouse 91 will be caught.

When the biting elements 212B touch the mouse 91, they are retracted automatically depending on the profile and stiffness of the points that the biting elements 212B touch with. As illustrated in FIG. 6, the head of the mouse 91 is hit by two biting elements 212B. The left biting element 212B is protruded a first length H1, and the right biting element 212B is protruded a second length H2. Because the biting elements 212B can be automatically retracted, the hitting force will be automatically adjusted so as to avoid they pierce the skin (causing bleeding). Besides, if the outer end of the biting element 212B is blunt, it will have a better result to avoid it pierce the mouse's skin (causing bleeding). But, this invention still can capture the mouse 91 firmly.

Figure 4A:
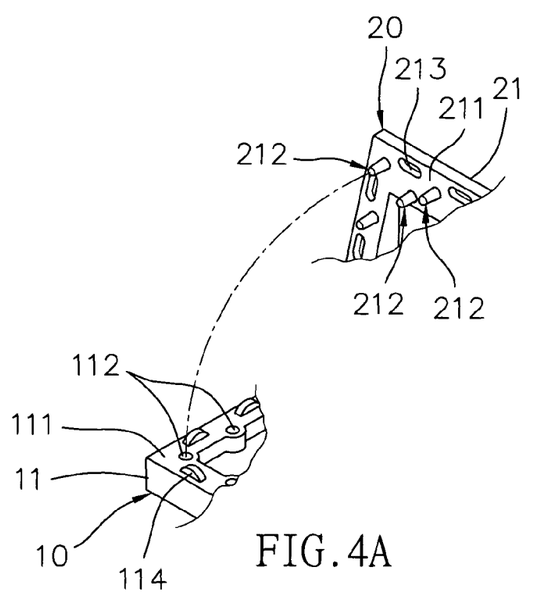
FIG. 4A is a view showing a portion of this invention when the front frame portion and the front seat are open.
Figure 4B:
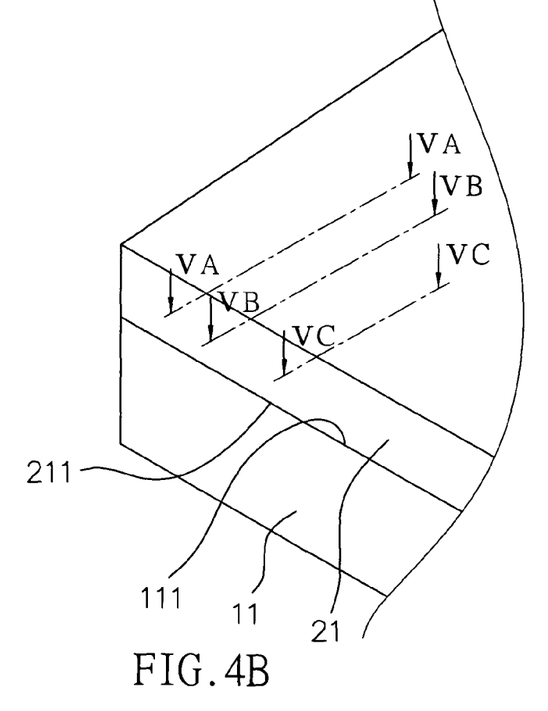
FIG. 4B is a view showing a portion of this invention when the front frame portion and the front seat are close.
Figure 5C:
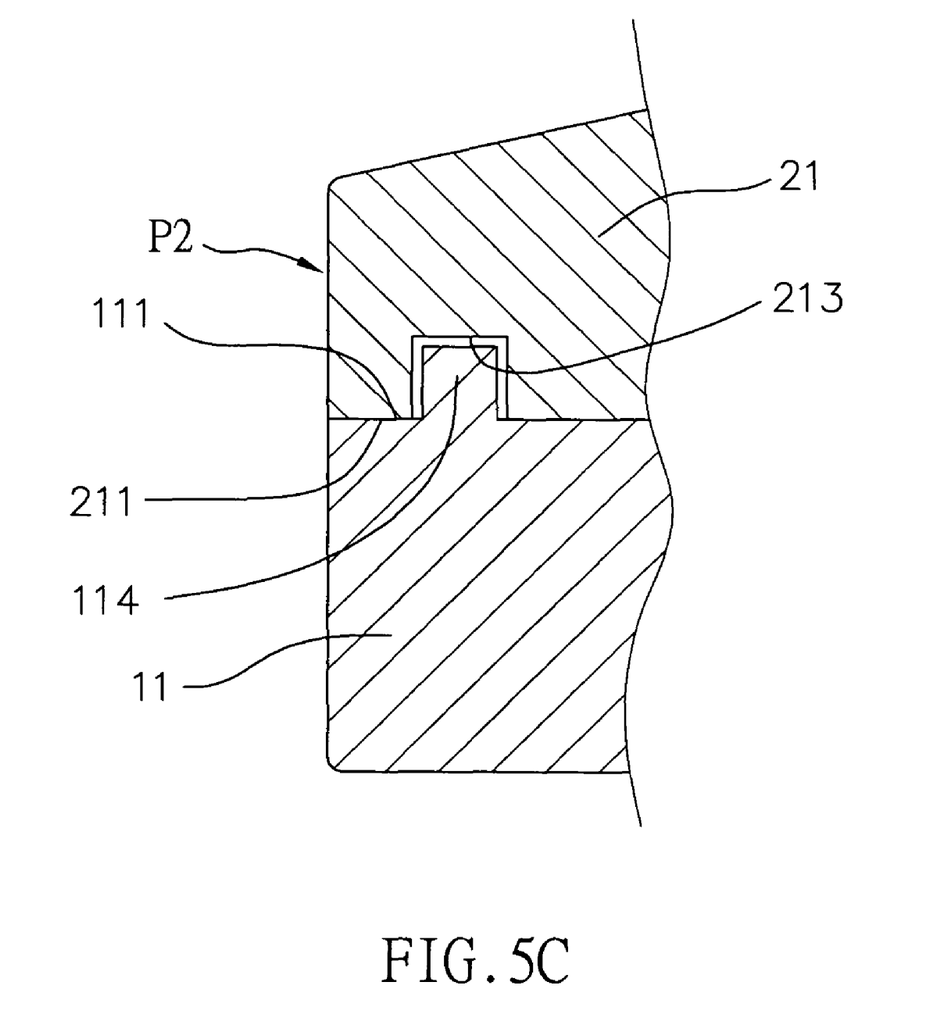
FIG. 5C is a cross-sectional view taken along VC-VC in FIG. 4B.

Practically, as shown in FIGS. 4A, 5A and 5C, the mouse trap of this invention may further include:

[a] a plurality of protruded blocks 114 disposed on the front seat 11 and adjoining to the receiving hole 112; and

[b] a plurality of block holes 213 disposed on the front frame portion 21 for receiving corresponding protruded blocks 114, the block holes 213 adjoining to the retractable biting portions 212.

Figure 7:
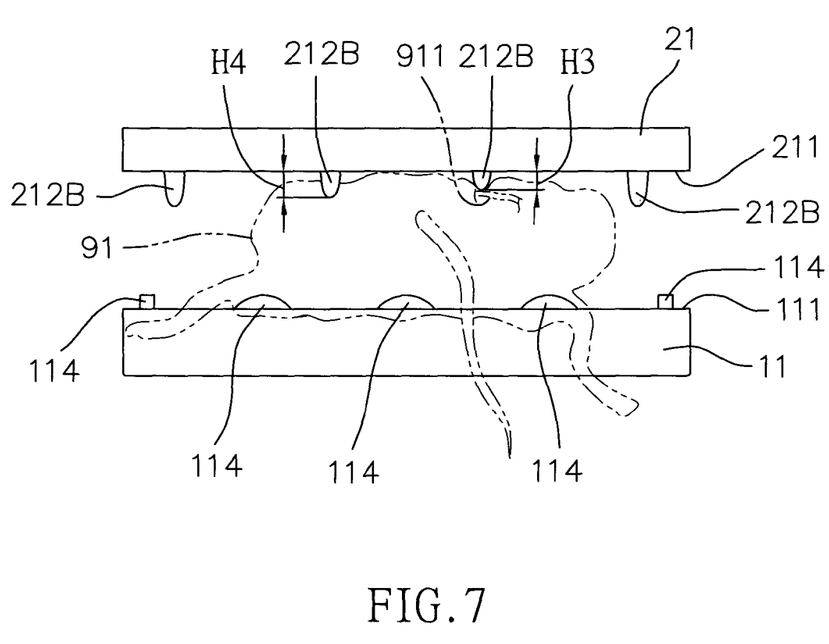
FIG. 7 is another view illustrating the mouse that is captured by the retractable biting portions and the protruded blocks.

As shown in FIG. 7, when the mouse 91 is captured, if the biting element 212B hits a portion just above a bone 911, the biting element 212B only protruded less (only protruded a third length H3). If another biting element 212B does not hits that portion above the bone 911 (such as hitting at a portion above muscle), the biting element will protrude more (might protrude a fourth length H4 which is larger than the third length H3). Thus, it can prevent the mouse 91 escaping when the biting element 212B hits the portion above the bone 911. However, it still can capture the mouse 91 effectively. Furthermore, due to the automatically retracted design of the biting elements 212B, all these biting elements 212B might have different protruded condition. When the biting element 212B hits the portion above the muscle, it will protrude more (that means biting deeper). When the biting element 212B hits the portion above the bone 911, it will protrude less (that means biting shallower). Every biting element 212B is independent and is self-adjusted about its biting depth. Hence, it can enhance the overall capturing result.

Therefore, the advantages and functions of this invention can be summarized as follows.

[1] The captured mouse will not bleed so it is sanitary. Because this invention has the retractable biting portion, biting depth of each biting elements is automatically adjusted. It can avoid the nasty bleed scene when the mouse is captured. Moreover, the captured mouse will not bleed so it is sanitary.

[2] The capture method is humane without sacrificing its capturing result. In nowadays society, being humane is very important. In this invention, the retractable biting portion can capture the mouse firmly without causing bleeding and screaming. The capture method of this invention is very humane. However, this invention still is very effective when the protruded blocks 114 and the block holes 213 are applied. So, the mouse is hard to escape.

[3] The safety of the product can be enhanced. The automatically retracted design of the biting element of this invention can prevent condition that the biting element pierces the skin of the mouse. Also, it significantly reduces, the possibility that it pieces the skin of a family member (such as a kid) or a pet (like a dog or cat). Such unintentional event might cause serious consequence. So, the safety of the product can be enhanced.

[4] The biting depth is automatically adjusted. Because each of the retractable biting portions is independent, some biting elements protrude more (such as near muscle) and some biting elements protrude less (such as near bone). So, the biting depth is automatically adjusted. Its capture result is great.

While this invention has been particularly shown and described with references to the preferred embodiments thereof, it will be understood by those skilled in the art that various changes or modifications can be made therein without departing from the scope of the invention by the appended claims.

What is claimed is:

1. A mouse trap having retractable biting portions comprising:
   a base having a front seat, a pivoting portion, and a rear seat, said front seat having a substantially U-shaped lower outer edge, a plurality of receiving holes, and a bait holder, a hooking portion being disposed on said rear seat;
   a movable portion having a front frame portion, an upper frame portion, and a restoring force generating element, said front frame portion being disposed with an upper outer edge and a plurality of retractable biting portions, said upper outer edge being corresponding to said lower outer edge, said movable portion being pivoted on said pivoting portion of said base and having at least a first position and a second position, said restoring force generating element generating a force to urge said movable portion moving from said first position to said second position;
   a trigger pivotally mounted on said base, said trigger having a triggering plate and a triggering opening, said triggering plate having a front triggering edge, so that when said trigger is pressed, said triggering opening slides over an opposite end of said hooking portion, so as to force said movable portion from said first position quickly moving to said second position, and said retractable biting elements insert into said corresponding receiving holes;
   each of said retractable biting portions including:
   [a] a recess disposed on said front frame portion;
   [b] a biting element being retractable within a predetermined distance in said recess, said biting element having an outer end and an inner end;
   [c] a resilient portion connected with said inner end of said biting element and said recess so that said biting element is retractable in said recess.

2. The mouse trap having retractable biting portions as claimed in claim 1, further comprising:
   a plurality of protruded blocks disposed on said front seat and adjoining to said receiving hole; and
   a plurality of block holes disposed on said front frame portion for receiving corresponding protruded blocks, said block holes adjoining to said retractable biting portions.

3. The mouse trap having retractable biting portions as claimed in claim 1, wherein said retractable biting element has a tooth length and can move between an extending position and a retracted position; when said retractable biting element moves to said extended position, at least 50% of said tooth length is protruded out; when said retractable biting element moves to said retractable position, 20% to 50% of said tooth length is protruded out.

4. The mouse trap having retractable biting portions as claimed in claim 1, wherein said outer end of said biting element is blunt.

5. The mouse trap having retractable biting portions as claimed in claim 1, wherein said restoring force generating element is a coiled spring or a leaf spring.

* * * * *